United States Patent
Song et al.

(10) Patent No.: US 9,044,827 B2
(45) Date of Patent: Jun. 2, 2015

(54) REAL-TIME IMPLEMENTATION OF GENERALIZED PREDICTIVE ALGORITHM FOR DIRECT METAL DEPOSITION (DMD) PROCESS CONTROL

(75) Inventors: Lijun Song, Ann Arbor, MI (US); Jyoti Mazumder, Ann Arbor, MI (US)

(73) Assignee: DM3D Technology, LLC, Troy, MI (US)

( * ) Notice: Subject to any disclaimer, the term of this patent is extended or adjusted under 35 U.S.C. 154(b) by 692 days.

(21) Appl. No.: 12/130,351

(22) Filed: May 30, 2008

(65) Prior Publication Data

US 2008/0296270 A1 Dec. 4, 2008

Related U.S. Application Data

(60) Provisional application No. 60/941,089, filed on May 31, 2007.

(51) Int. Cl.
  *B23K 26/34* (2014.01)
  *B23K 26/14* (2014.01)
  *B23K 26/03* (2006.01)
  *B23K 26/12* (2014.01)

(52) U.S. Cl.
  CPC ............. *B23K 26/1411* (2013.01); *B23K 26/03* (2013.01); *B23K 26/032* (2013.01); *B23K 26/034* (2013.01); *B23K 26/038* (2013.01); *B23K 26/123* (2013.01)

(58) Field of Classification Search
  CPC ..................................................... B23K 26/34
  USPC ............. 219/121.63–121.66, 121.83, 121.85; 700/28; 702/135; 374/121; 250/338, 250/341.1, 341.6, 341.8
  See application file for complete search history.

(56) References Cited

U.S. PATENT DOCUMENTS

| | | | | |
|---|---|---|---|---|
| 5,118,917 A * | 6/1992 | Van Krieken et al. | ... | 219/121.66 |
| 5,329,442 A * | 7/1994 | Moshfegh | | 700/29 |
| 5,428,562 A * | 6/1995 | Gay | | 708/322 |
| 5,517,420 A * | 5/1996 | Kinsman et al. | | 700/166 |
| 5,530,221 A * | 6/1996 | Benda et al. | | 219/121.83 |
| 5,796,761 A * | 8/1998 | Injeyan et al. | | 372/3 |
| 6,122,564 A * | 9/2000 | Koch et al. | | 700/123 |
| 6,362,456 B1 * | 3/2002 | Ludewig et al. | | 219/124.34 |
| 6,751,516 B1 * | 6/2004 | Richardson | | 700/119 |
| 6,809,820 B2 * | 10/2004 | Snelling et al. | | 356/337 |
| 6,813,533 B1 * | 11/2004 | Semak | | 700/118 |
| 6,868,358 B2 * | 3/2005 | Brown, Jr. | | 702/138 |
| 6,972,390 B2 * | 12/2005 | Hu et al. | | 219/121.64 |
| 7,043,330 B2 * | 5/2006 | Toyserkani et al. | | 700/166 |
| 7,072,377 B2 * | 7/2006 | Douglas-Hamilton | | 372/100 |
| 7,227,960 B2 * | 6/2007 | Kataoka | | 381/92 |
| 7,595,894 B2 * | 9/2009 | Hu et al. | | 356/604 |
| 7,766,213 B2 * | 8/2010 | Henrikson | | 228/103 |
| 2002/0156542 A1 * | 10/2002 | Nandi | | 700/30 |
| 2006/0165137 A1 * | 7/2006 | Kachanov et al. | | 372/21 |

* cited by examiner

*Primary Examiner* — Samuel M Heinrich
(74) *Attorney, Agent, or Firm* — Warner Norcross & Judd LLP

(57) ABSTRACT

A direct metal deposition (DMD) process is stabilized by monitoring the temperature and the shape of the melt pool during deposition, applying a recursive least square (RLS) model estimation algorithm to adaptively identify process characteristics in accordance with the temperature and the shape of the melt pool, and delivering the process characteristics to a generalized predictive controller with input constraints to control the process. The process may be controlled by adjusting laser power or by adjusting the speed of the movement of the laser. In the preferred embodiment the temperature is monitored using a two-color pyrometer, and the shape of the melt pool is monitored by detecting the edge of the melt pool with a camera and/or photodetector.

10 Claims, 1 Drawing Sheet

REAL-TIME IMPLEMENTATION OF GENERALIZED PREDICTIVE ALGORITHM FOR DIRECT METAL DEPOSITION (DMD) PROCESS CONTROL

REFERENCE TO RELATED APPLICATION

This application claims priority from U.S. Provisional Patent Application Ser. No. 60/941,089, filed May 31, 2007, the entire content of which is incorporated herein by reference.

FIELD OF THE INVENTION

This invention relates generally to additive manufacturing and, in particular, to a system and method of stabilizing a direct metal deposition (DMD) process of the type wherein a powder is fed into a laser-generated melt pool.

BACKGROUND OF THE INVENTION

Direct Metal Deposition (DMD) is an additive manufacturing technology utilizing a precisely controlled laser beam to melt powders onto a substrate to form products. DMD with a closed-loop control system has been successfully applied in complicated part prototyping, repairs and surface modifications [1]. DMD is a multi-parameter process where, laser power, traverse speed and powder feed rate are considered the most dominant parameters that determine the dimensional accuracy and mechanical properties of products. Other secondary important parameters include laser beam size, delivery and shielding gases, nozzle design, bead overlap, z increment, tool path design, and powder qualities. Any disturbance from the controlling parameters, environment, and pool itself (surface tension, flow-ability), may shift the process away from its stable point and result in defects in the produced parts.

Mazumder et al. proposed a closed-loop controlled DMD system, in which three photo-detectors were used to monitor the molten pool height [1, 2]. A control unit, where an OR logic function was operated on the three signals from photo-detectors, was used to trigger off the laser when the detected pool height was above the pre-set limits. This closed-loop control system proved to be successful in controlling the dimensional accuracy of the produced parts. POM Group Inc. in Auburn Hills has commercialized the system and installed the system on three different continents.

A dynamic model of the DMD process is essential for advanced model based closed-loop controller designs. Several theoretical and numerical models have been studied to give insight into the process [3-7]. However, because of limitations, complexities and extensive numerical operations of the simulations, these models are not practical for in-process control. Experimental-based modeling using system identification has been reported to identify the nonlinear input-output dynamic relationship between traverse velocity and deposition bead height [8]. However, significant deviations existed between the actual data and the model outputs. To overcome the difficulties of the system modeling, a fuzzy logic controller was implemented where only the fuzzy knowledge of the process was needed [9].

Current sensing and modeling efforts have been focused on cladding tracks and molten pools. Monitoring cladding tracks can directly provide dimensional information of depositions [8]. However, monitoring cladding tracks introduces inherent process delays which must be compensated for in the controller. On the other hand, sensing molten pools can provide online process information, which could enable real time process control without process delays [1]. Optical intensity [1] and infrared images [10] of molten pools have been successfully employed to control the cladding process. Pool temperature measurement and transient mathematical modeling of the process have been reported by Han et al [6, 7]. Pool temperature during the process can indicate microstructures and mechanical properties of the products. A constant temperature during processing reflects a near uniform deposition.

SUMMARY OF THE INVENTION

This invention resides in a system and method of stabilizing a direct metal deposition (DMD) process of the type wherein a powder is fed into a laser-generated melt pool. The method includes the steps of monitoring the temperature and the shape of the melt pool during deposition, applying a recursive least square (RLS) model estimation algorithm to adaptively identify process characteristics in accordance with the temperature and the shape of the melt pool, and delivering the process characteristics to a generalized predictive controller with input constraints to control the process. The process may be controlled by adjusting laser power or by adjusting the speed of the movement of the laser. In the preferred embodiment the temperature is monitored using a two-color pyrometer, and the shape of the melt pool is monitored by detecting the edge of the melt pool with a camera and/or photodetector.

A system for stabilizing a direct metal deposition (DM) process according to the invention comprises:
a device such as a pyrometer for monitoring the temperature of the melt pool during deposition;
a device such as a video camera or photodetector for monitoring the shape of the melt pool during deposition;
a processor using a recursive least square (RLS) model estimation algorithm to adaptively identify process characteristics in accordance with the temperature and the shape of the melt pool; and
a generalized predictive controller with input constraints to control the process based upon the characteristics.

DETAILED DESCRIPTION OF THE INVENTION

This invention resides in an advanced, real-time implementation of generalized predictive control algorithm to control the direct metal deposition (DMD) process. In the preferred embodiment, the molten pool area temperature during deposition is monitored using a two-color pyrometer. The process dynamics are identified online, and the corresponding generalized predictive controller is used to control the laser power to stabilize the process.

Figure 1:
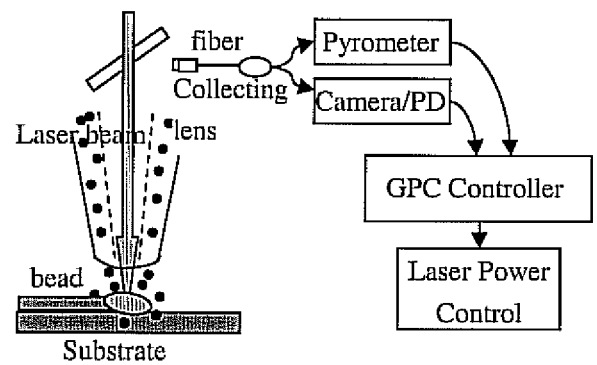
FIG. 1 shows the sensing and control system for the DMD process according to the invention.

FIG. 1 shows the experimental set up of the sensing and control system for the DMD process. The laser beam is delivered through the inner nozzle. The powder is delivered from the outer layer of the nozzle coaxially with the laser beam. Argon and Helium are used as shielding and delivery gases.

The nozzle is cooled using circulating water. High-speed CCD cameras or photo diodes are connected via optical fiber to collecting lenses to monitor the molten pool. Edge-detection is used to analyze the images to obtain the molten pool shape. A two-color pyrometer, also connected by fiber with a collecting lens, is used to monitor the molten pool temperature. Two-color detection was chosen for its accurate temperature measurement.

Figure 2:
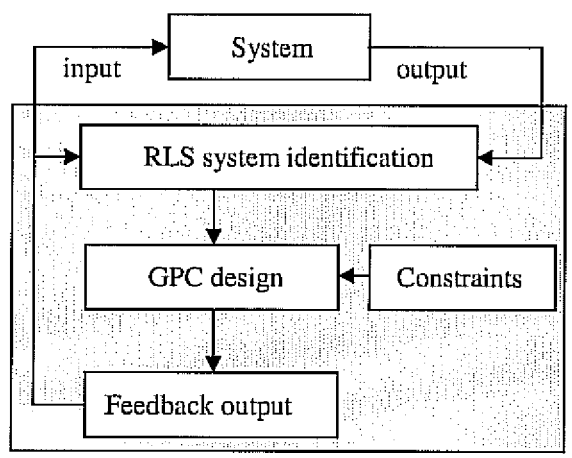
FIG. 2 shows the structure of the generalized predictive controller.

The controller contains two parts: a) a recursive least square (RLS) model estimation algorithm to adaptively identify the process, and b) a generalized predictive control with input constraints to control the process. FIG. 2 shows the structure of the generalized predictive controller design.

The invention provides a comprehensive sensing system to monitor the molten pool parameters, including pool geometry and pool temperature so as to identify the molten pool dynamics during the DMD process. The preferred embodiment uses a simplified generalized predictive control algorithm with constraints to control the molten pool temperature using laser power. Since appropriate parameters may be used to control the pool geometry, cladding size and dimensional accuracy may be precisely controlled. In addition to laser power, the system and method can control the DMD process using other parameters such as the traverse speed of the CNC machine.

REFERENCES

[1] Mazumder J., Dutta D., Kikuchi N., Ghosh A., (2000) Closed loop direct metal deposition: art to part, Optics and Laser Engineering 34, 397-414
[2] Koch J. and Mazumder J., U.S. Pat. No. 6,122,564, "Apparatus and methods for monitoring and controlling multilayer laser cladding", Sep. 19, 2000
[3] Kar A., Mazumder J. (1987), One dimensional diffusion model for extended solid solution in laser cladding, J. Appl. Phys. 61, 2645-2655
[4] Picasso M., Marsden C. F., Wagniere J. D., Frenk A., and Rappaz M. (1994) A simple but realistic model for laser cladding, Metallurgical and Materials Transactions B, 25B, 281-291
[5] He X., Mazumder J. (2006), Modeling of geometry and Temperature during direct metal deposition, 25$^{th}$ International Congress on Applications of Lasers & Electro-Optics (ICALEO), Scottsdale, Ariz.
[6] Han L., Liou F. W., and Phatak K. M. (2004) Modeling of laser cladding with powder injection, Metallurgical and Materials Transactions B, 35B, 1139-1150
[7] Han L., Phatak K. M., Liou F. W. (2005) Modeling of laser deposition and repair process, Journal of Laser Applications, 17 (2), 89-99
[8] Toyserkani E., Khajepour A., and Corbin S. (2002) Application of experimental based modeling to laser cladding, Journal of Laser Applications, 14 (3), 165-173
[9] Hua Y and Choi J. (2005) Adaptive direct metal/material deposition process using a fuzzy logic-based controller, Journal of Laser Applications, 17(4), 200-210
[10] Hu D., Kovacevic R. (2003) Sensing, modeling and control for laser based additive manufacturing, International Journal of Machine Tools & Manufacture, 43, 51-60.

We claim:

1. A method of stabilizing a direct metal deposition (DMD) process of the type wherein a powder is fed into a laser-generated melt pool, comprising the steps of:
   monitoring the temperature and the shape of the melt pool during deposition of the melt pool;
   applying a recursive least square (RLS) model estimation algorithm to data generated by monitoring the temperature and the shape of the melt pool for identifying process characteristics from the temperature and the shape of the melt pool;
   delivering the process characteristics to a generalized predictive controller for predicting the temperature and shape of the melt pool and adjusting the process characteristics with input constraints from predicted temperature and shape of the melt pool to control the direct metal deposition process in real time.

2. The method of claim 1, wherein the process is controlled by adjusting laser power.

3. The method of claim 1, wherein the process is controlled by adjusting the speed of the movement of the laser.

4. The method of claim 1, wherein the temperature is monitored using a two-color pyrometer.

5. The method of claim 1, wherein the shape of the melt pool is monitored by detecting the edge of the melt pool.

6. A system for stabilizing a direct metal deposition (DMD) process of the type wherein a powder is fed into a laser-generated melt pool, comprising:
   a device for monitoring the temperature of the melt pool during deposition;
   a device for monitoring the shape of the melt pool during deposition;
   a processor applying a recursive least square (RLS) model estimation algorithm to the temperature and shape of the melt pool at the time of deposition of the melt pool for predicting process characteristics of the system from the temperature and the shape of the melt pool thereby generating predicted process characteristics; and
   a generalized predictive controller programmed with input constraints for adjusting the direct metal deposition (DMD) process in real time based upon the predicted process characteristics.

7. The system of claim 6, wherein the process is controlled by adjusting laser power.

8. The system of claim 6, wherein the process is controlled by adjusting the speed of the movement of the laser.

9. The system of claim 6, wherein the temperature is monitored using a two-color pyrometer.

10. The system of claim 6, wherein the shape of the melt pool is monitored by detecting the edge of the melt pool.

* * * * *